Oct. 22, 1929.  F. J. S. JONES  1,732,443
LIQUID FUEL SUPPLY DEVICE
Filed July 19, 1928

INVENTOR.
F. J. S. JONES.
per George Hughes,
ATTORNEY

Patented Oct. 22, 1929

1,732,443

UNITED STATES PATENT OFFICE

FRANCIS JOSEPH STAWELL JONES, OF PORTHCAWL, GLAMORGAN, WALES

LIQUID-FUEL-SUPPLY DEVICE

Application filed July 19, 1928, Serial No. 293,931, and in Great Britain August 10, 1927.

This invention relates to devices suitable for such purposes as raising liquid fuel from a main supply tank to a point above a carburetor so that the liquid fuel can flow by gravity to the carburetor, and for analogous purposes. Many such devices have heretofore been proposed for use with internal combustion engines, and more particularly on motor road vehicles, such devices generally being referred to as vacuum feed devices and generally consisting of a vessel connected to a source of suction, for instance the induction manifold of an engine and to a main supply tank, a float inside the vessel rising and falling with the level of liquid drawn into the vessel and controlling valves to determine the discharge and charging of the vessel. The object of my present invention is to provide a novel vacuum feed device in which the necessity of the use of a float and its attendant disadvantages are obviated, and to ensure cheapness and efficiency in production.

According to my invention I provide a suction or auxiliary vessel, i. e. a vessel adapted to be connected to a source of suction and to a source of liquid supply and in said vessel I provide means which enables the liquid upon reaching a predetermined level in it to act as a seal to confine the suction to a secondary chamber in such vessel so as to charge such secondary chamber with liquid to a level above the said predetermined level of liquid in the suction vessel, means being provided whereby upon the level of liquid in the said secondary chamber reaching a predetermined level it (the chamber) is isolated from the source of suction, and the said suction vessel is placed under the influence of atmospheric pressure to enable the liquid to flow to a source of supply, for instance a supplementary vessel connected to the float chamber of a carburetor, the said predetermined level in the suction vessel being maintained by a supply from the said secondary chamber until a predetermined quantity of liquid has been delivered from the secondary chamber, at which moment the connection to the source of suction and supply is opened to recommence the cycle of operations.

In the preferred embodiment of my invention, the said suction vessel can be the usual auxiliary vessel having a liquid inlet adjacent its upper end, and a liquid outlet fitted with a valve which when suction is on, is closed but otherwise can open to permit the liquid to flow into a supplementary vessel constantly under atmospheric pressure and connected by suitable tubing to the float chamber of a carburetor. These features are common to most known liquid fuel supply apparatus of the suction feed type, but instead of employing a float in the auxiliary vessel to control the apparatus I provide the said secondary chamber, which in the preferred form is an inverted bell or equivalent shaped body movable relative to the suction vessel, the suction passage being carried to a point adjacent the upper end of the said inverted bell or equivalent shaped body so that when the liquid drawn into the auxiliary vessel reaches the rim of the bell the suction will be confined to the interior of the bell with a consequent rise of liquid fuel into the bell only until the liquid in the bell reaches such a level that its weight will cause the bell to move, such movement being utilized to close the suction passage and open an air inlet passage in the suction or auxiliary vessel.

It is preferred to employ spring means to return the secondary chamber (the bell) to its normal raised position, to recommence the cycle of operations, and a feature of my invention is a particular form of spring means I prefer to employ for this purpose.

In order that my invention may be readily understood and readily carried into effect, I have appended hereto a sheet of drawings illustrating somewhat diagrammatically an embodiment of same and wherein, Fig. 1 is a sectional elevation showing the relationship of the various parts, the apparatus being idle.

Figure 1:
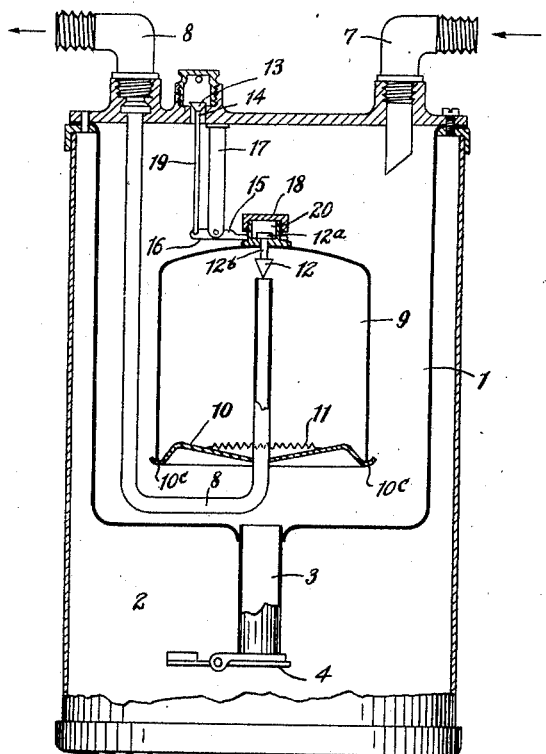

Referring to the drawings, I have shown the usual form of auxilary vessel 1 disposed above and inside the usual supplementary vessel 2 and showing a flap valve controlled outlet 3, the flap valve of known form being indicated at 4. The supplementary vessel 2 is constantly under atmospheric pressure and has the usual outlet 5, and if necessary drain tap 6. These parts can be modified without departing from the spirit and scope of my invention.

The liquid supply conduit is indicated at 7, and the suction passage 8, is carried to a point adjacent the upper end and inside what I term a secondary chamber 9 which is capable of a slight up and down movement relative to the auxiliary vessel 1.

The secondary chamber 9 is in its preferred form an inverted bell shaped body supported at its rim on the outer ends of a pair of arms 10, 10 radiating from the pipe 8, the inner ends of these arms being notched or arched as indicated at 10$^a$ for engagement with the pipe 8 under the influence of a pair of coiled tension springs 11 connected across lateral projections 10$^b$ of the arms 10. The outer ends of the arms 10 are hooked or bent as indicated at 10$^c$ to support the rim of the secondary chamber 9 and the arms 10 are inclined symmetrically upwards from the pipe 8 at a small angle relative to the horizontal plane, so that the springs 11 tend to force the outer ends of the arms 10 upwards.

Disposed above the open end of the suction pipe 8 is a conical or other suitable valve 12 carried by the top of the secondary chamber 9, and adapted when the secondary chamber drops to close the suction passage, the dropping of the chamber 9 also being utilized to open a valve 13 which is closed when the suction passage is open, the valve 13 opening an air inlet passage 14 to the vessel 1. The valve 13 and passage 14 could be substituted by a small bleed hole constantly open, but increased efficiency is obtained by closing the air passage when the suction passage is open.

A simple method of operating the air valve 13 consists in providing a small fulcrumed arm 15 pivotally supported at 16 by a depending bracket 17, one end of said arm being forked for engagement with a cap 18 on the secondary chamber 9 and the other end being pivotally connected to a rod 19 connected to the air valve 13. The cap 18 closes the top of a hollow boss 20 fixed to the top of the secondary chamber 9 and accommodating the head 12$^a$ of a pin 12$^b$ carrying the valve 12, the arrangement being that the pin 12$^b$ can slide relative to the chamber 9 so that the valve 12 seats on the end of the suction pipe 8 and closes it before the chamber 9 reaches its lowest position.

The amount of movement of the secondary chamber 9 is quite small, being in fact just sufficient to move the two arms 10 through an angle which does not quite bring them to the horizontal plane, or in other words they do not quit reach the point at which the springs 11 would be at their maximum stretch, in order to ensure that the springs will re-act to return the secondary chamber to its raised position. The strength of the springs 11 will of course depend upon the weight of the chamber 9, which can be quite a light thin metal body, and the capacity of the chamber 9, this latter reason being hereinafter more apparent.

Assuming the apparatus to be empty, its operation when suction is applied to the passage 8 is as follows:—

Figure 2:
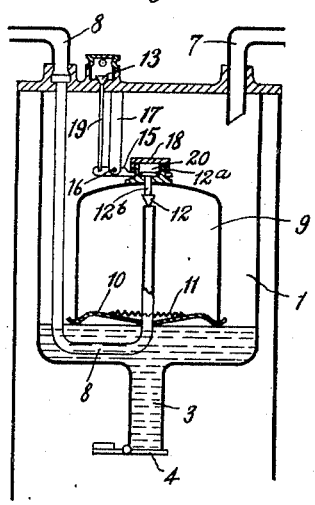
Fig. 2 is a diagrammatic sectional view showing the apparatus soon after the commencement of operations.
Figure 3:
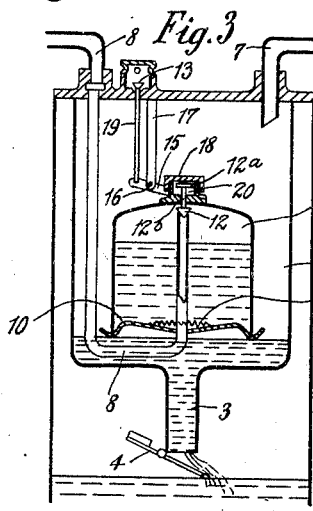
Fig. 3 is a similar view showing the apparatus when the suction passage is closed.
Figure 4:
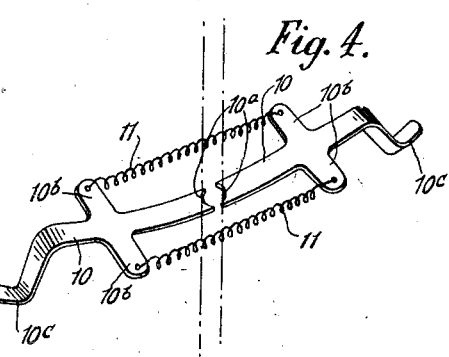
Fig. 4 is a detail perspective view of the preferred form of spring means for raising the secondary chamber.

The secondary chamber 9 is in the raised position consequently the suction passage 8 is open and the atmosphere hole 14 closed by its valve 13, with the result that liquid is drawn into the auxiliary vessel 1, the flap valve 4 being closed due to the suction, or the rarefaction of the air in the auxiliary vessel 1. The liquid will flow via the inlet 7 into the vessel 1 and will ultimately reach the rim of the inverted bell shaped secondary chamber 9 (see Fig. 2) with the result that the annular space surrounding the secondary chamber 9 will be isolated from the suction owing to the level of the liquid in the vessel 1 sealing the interior of the secondary chamber 9 from the space in the vessel 1 above the rim of the chamber 9. The suction will now only be applied inside the secondary chamber 9 so that liquid fuel will rise in the chamber 9 until ultimately it reaches a level such that the weight of liquid in the chamber 9 will be greater than the influence of the springs 10 resulting in the chamber 9 dropping slightly, closing the suction passage 8 by the valve 12 and opening the atmosphere hole 14. The liquid in the auxiliary vessel 1 will now flow into the supplementary vessel 2 which if previously empty or nearly empty would undoubtedly result in all or nearly all of the liquid in the vessel 1 and chamber 9 flowing into the supplementary vessel 2, the springs 10 then returning the secondary chamber 9 to the raised position opening the suction passage 8, closing the cycle of operations. However, normally the supplementary vessel 2 would be charged to an appreciable extent, consequently the flow of liquid from the auxiliary vessel 1 into the supplementary vessel 2 would correspond to the demand on the store of liquid in the supplementary vessel 2. With the average carburetor supply, this would be only a trickle so that as the level of liquid fell, in the auxiliary vessel 1 outside the chamber 9, it would instantly be replenished by the liquid inside the chamber 9 until the chamber 9 becomes emptied when the springs 11 would return the chamber 9 to the normal raised position.

In designing the springs 11 and their arms 10 due regard has to be given to the fact that owing to the springs 11 being almost at the maximum stretched position, i. e. the arms 10 are not quite horizontal, the lifting effort of the springs 11 when the chamber 9 is in the dropped position is very small, whereas as the angle between the arms 10 is decreased the lifting effort of the springs 11 will increase up to a certain angular relationship of the arms 10. For this reason a certain amount of lost motion is provided between the suction valve 12 and the chamber 9 as hereinbefore described so that the suction effort on the valve 12 will not have to be overcome until after the chamber 9 has commenced to rise by which time the effort acquired by the springs 10 plus the small momentum of the moving chamber will be sufficient to snap the valve 12 off its seating and quickly return the chamber 9 to the raised position to recommence the cycle of operations.

What I claim is:—

1. In a liquid fuel and the like supply device, an auxiliary vessel, a secondary chamber in the auxiliary vessel and always open to the interior of the auxiliary vessel, a liquid inlet to the auxiliary vessel, a suction connection to the interior of said secondary chamber, and a liquid outlet in the base of said auxiliary vessel, the relative positions of the secondary chamber and the auxiliary vessel being such that upon the liquid drawn into the auxiliary vessel reaching a predetermined level it confines the suction and further rise of liquid to the interior of the secondary vessel, and means for arresting the supply of liquid to the device upon the liquid reaching a predetermined level in the secondary chamber.

2. Liquid fuel or the like supply apparatus comprising an auxiliary vessel connected to a source of liquid supply, a secondary chamber open at its base and supported for relative movement inside said auxiliary chamber, means for connecting a source of suction to the interior of said secondary chamber, means to utilize the movement of said secondary chamber for isolating it from the source of suction when a predetermined quantity of liquid has been drawn into the auxiliary chamber, and a gravity liquid discharge from the auxiliary chamber.

3. In liquid fuel and the like supply device an auxiliary vessel, a connection to a source of suction, a secondary chamber in the auxiliary vessel, means to confine the suction to the secondary chamber when the liquid reaches a predetermined level in the auxiliary chamber, and means to isolate the secondary chamber from the source of suction when the liquid reaches a predetermined level in the secondary chamber and to place the said auxiliary vessel under atmospheric pressure, and connect the auxiliary vessel to the appliance to be supplied by gravity with liquid fuel, the secondary chamber being movable relative to the auxiliary vessel and accommodating means for opening and closing the connection to the source of suction.

4. Liquid fuel or the like supply apparatus comprising an auxiliary vessel connected to a source of liquid supply, a secondary chamber open at its base and supported for relative movement inside said auxiliary chamber, means for connecting a source of suction to the interior of said secondary chamber, means to utilize the movement of said secondary chamber for isolating it from the source of suction when a predetermined quantity of liquid has been drawn into the auxiliary chamber, and a gravity liquid discharge from the auxiliary chamber, an atmosphere valve, and a mechanical connection between said secondary chamber and said atmosphere valve for opening and closing said valve.

5. Liquid fuel or the like supply apparatus comprising an auxiliary vessel connected to a source of liquid supply, a secondary chamber open at its base and supported for relative movement inside said auxiliary chamber, means for connecting a source of suction to the interior of said secondary chamber, means to utilize the movement of said secondary chamber for isolating it from the source of suction when a predetermined quantity of liquid has been drawn into the auxiliary chamber, and a gravity liquid discharge from the auxiliary chamber, an atmosphere valve in said auxiliary vessel, and a pivoted arm to which said secondary chamber is connected for opening and closing said atmosphere valve.

6. Liquid fuel or the like supply apparatus comprising an auxiliary vessel connected to a source of liquid supply, a secondary chamber open at its base and supported for relative movement inside said auxiliary chamber, means for connecting a source of suction to the interior of said secondary chamber, means to utilize the movement of said secondary chamber for isolating it from the source of suction when a predetermined quantity of liquid has been drawn into the auxiliary chamber, and a gravity liquid discharge from the auxiliary chamber, an atmosphere valve, and a mechanical connection between said secondary chamber and said atmosphere valve for opening and closing said valve, arms supporting said secondary chamber, resilient means with said arms to permit downward movement of the secondary chamber when a predetermined quantity of liquid fuel has been drawn into the secondary chamber and to raise the secondary chamber when the liquid fuel is delivered therefrom.

7. Liquid fuel and the like supply apparatus comprising an auxiliary chamber located within and communicating by means of a foot valve with a supplementary chamber, an inverted substantially bell shaped chamber mounted inside said auxiliary chamber, a support for said bell shaped chamber which permits it to move downwards upon a predetermined supply of liquid being drawn into it and raises it to its normal position when the liquid has flown from it, a source of suction connected to the interior of said inverted bell shaped chamber, a source of liquid supply to the interior of said auxiliary chamber, and a valve inside said inverted bell shaped chamber which when said bell shaped chamber moves downwards closes the connection to the source of suction and when the bell shaped chamber rises, re-opens the connection to the source of suction.

8. Liquid fuel and the like supply apparatus comprising an auxiliary vessel, a reserve chamber, a suction closed valve controlled passage between said auxiliary vessel and the reserve chamber, an inverted substantially bell shaped chamber inside said auxiliary vessel, a suction passage extending from a connection to a source of suction through the auxiliary vessel and terminating adjacent the upper end of said inverted bell shaped chamber, a pair of arms supporting the said bell shaped chamber and arranged at a large angle relative to each other, a tension spring connected across them, a valve actuated by the bell shaped chamber for closing the suction passage, means actuated from the bell shaped chamber for opening and closing an atmosphere valve, and a liquid supply passage into said auxiliary chamber.

9. Liquid fuel and the like supply apparatus comprising an auxiliary vessel, a reserve chamber, a suction closed valve controlled passage between said auxiliary vessel and the reserve chamber, an inverted substantially bell shaped chamber inside said auxiliary vessel, a suction passage extending from a connection to a source of suction through the auxiliary vessel and terminating adjacent the upper end of said inverted bell shaped chamber, a pair of arms supporting the said bell shaped chamber and arranged at a large angle relative to each other, a tension spring connected across them, a valve relatively movable inside said bell shaped chamber for opening and closing a suction passage terminating inside said bell shaped chamber, means actuated from the bell shaped chamber for opening and closing an atmosphere valve, and a liquid supply passage into said auxiliary chamber.

In witness hereof I have signed this specification.

FRANCIS JOSEPH STAWELL JONES.